United States Patent [19]

Van Oel et al.

[11] Patent Number: 5,526,238

[45] Date of Patent: Jun. 11, 1996

[54] ADJUSTING AND SUPPORT APPARATUS FOR A LAMP UNIT

[75] Inventors: Robert W. Van Oel, Saline; Stuart R. Oke, Dearborn Heights; Denise M. Mitchell, Farmington Hills, all of Mich.

[73] Assignee: Ford Motor Company, Dearborn, Mich.

[21] Appl. No.: 997,463

[22] Filed: Dec. 28, 1992

[51] Int. Cl.⁶ ..................................................... B60Q 1/06
[52] U.S. Cl. .............................. 362/66; 362/421; 362/427
[58] Field of Search ................................ 362/61, 66, 287, 362/420, 421, 428, 427

[56] References Cited

U.S. PATENT DOCUMENTS

| | | | |
|---|---|---|---|
| 3,823,314 | 7/1974 | Germany | 240/41.6 |
| 4,142,228 | 2/1979 | Kumagai et al. | 362/233 |
| 4,188,655 | 2/1980 | Tallon et al. | 362/80 |
| 4,471,413 | 9/1984 | Dick | 362/80 |
| 4,491,901 | 1/1985 | Sigety, Jr. | 362/275 |
| 4,569,007 | 2/1986 | Dick | 362/294 |
| 4,574,334 | 3/1986 | Igura | 362/66 |
| 4,707,768 | 11/1987 | Ball | 362/66 |
| 4,722,029 | 1/1988 | Ahle et al. | 362/66 |
| 4,870,544 | 9/1989 | Iwamoto | 362/66 |
| 4,894,754 | 1/1990 | Levilain | 362/66 |
| 5,016,155 | 5/1991 | Chevance | 362/66 |
| 5,067,056 | 11/1991 | Suzuki et al. | 362/66 |
| 5,107,406 | 4/1992 | Sekido et al. | 362/421 |
| 5,186,532 | 2/1993 | Ryder et al. | 362/66 |

FOREIGN PATENT DOCUMENTS 2276194  1/1976  France.

Primary Examiner—James C. Yeung
Assistant Examiner—Alan B. Cariaso
Attorney, Agent, or Firm—Roger L. May; Daniel M. Stock

[57] ABSTRACT

An adjusting and support apparatus for a lamp unit is provided which has a horizontal adjust and support mechanism in which the load bearing and adjusting functions are separated to provide an improved support structure which does not rely on a cantilevered arrangement. In addition, a vertical adjustment mechanism which can be secured to any unoccupied position on the outside surface of the lamp unit is provided, thereby imparting greater flexibility to the design of the front portion of the vehicle.

21 Claims, 10 Drawing Sheets

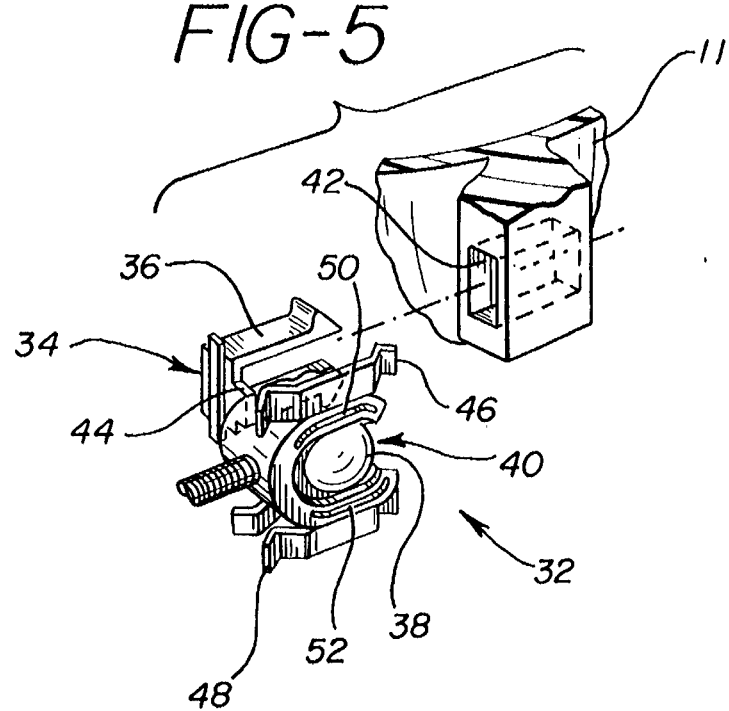
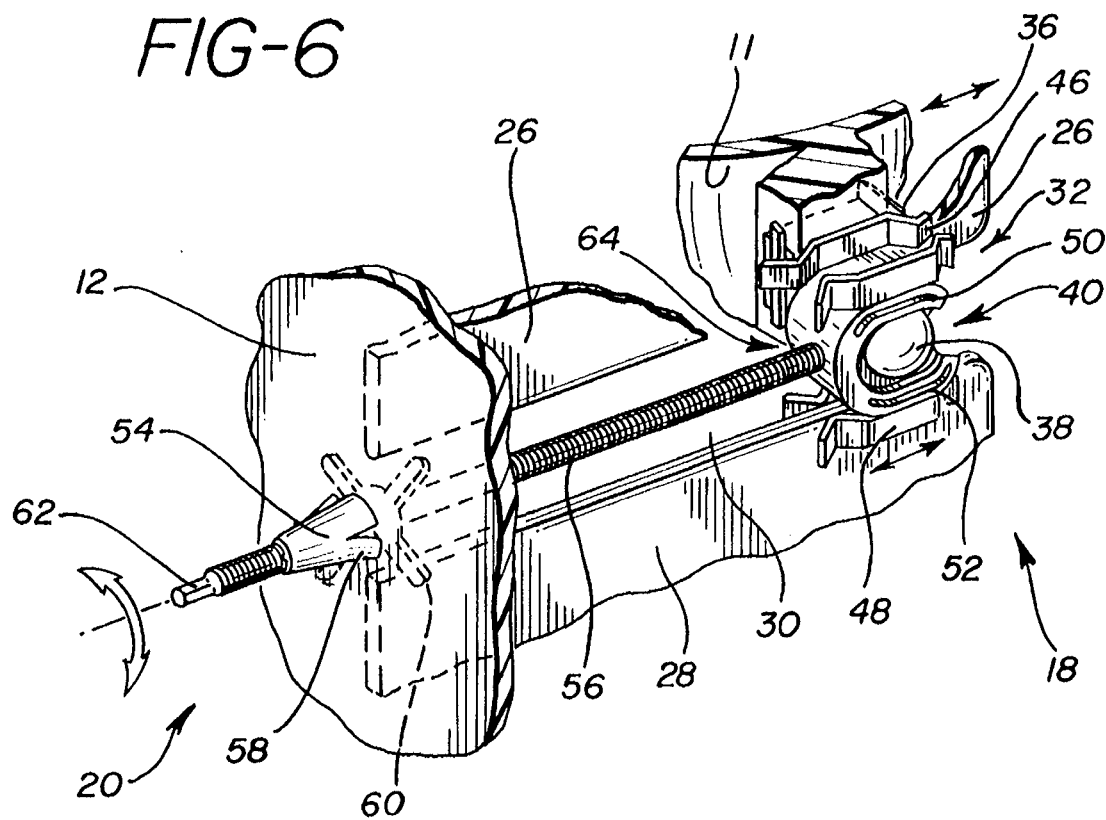

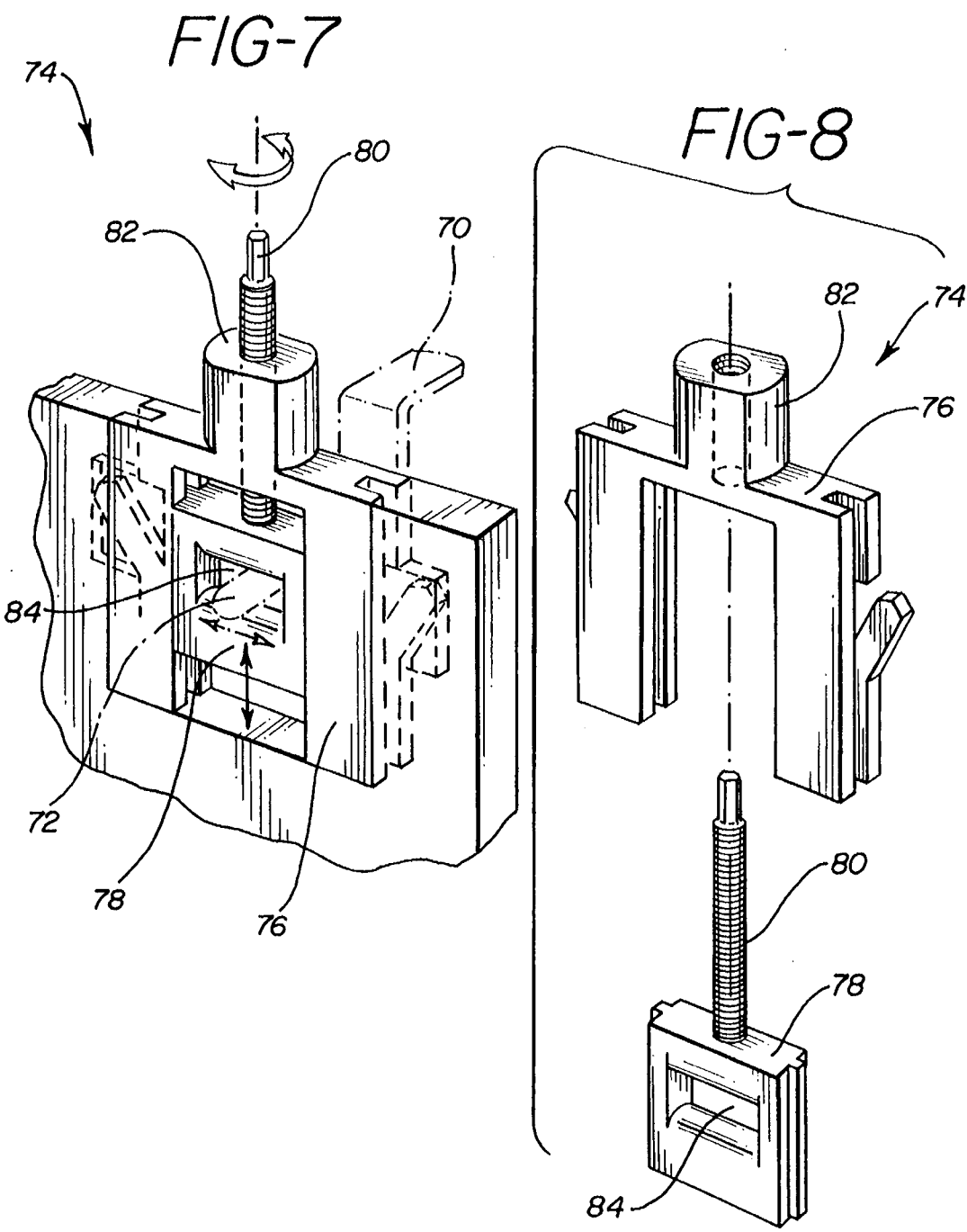

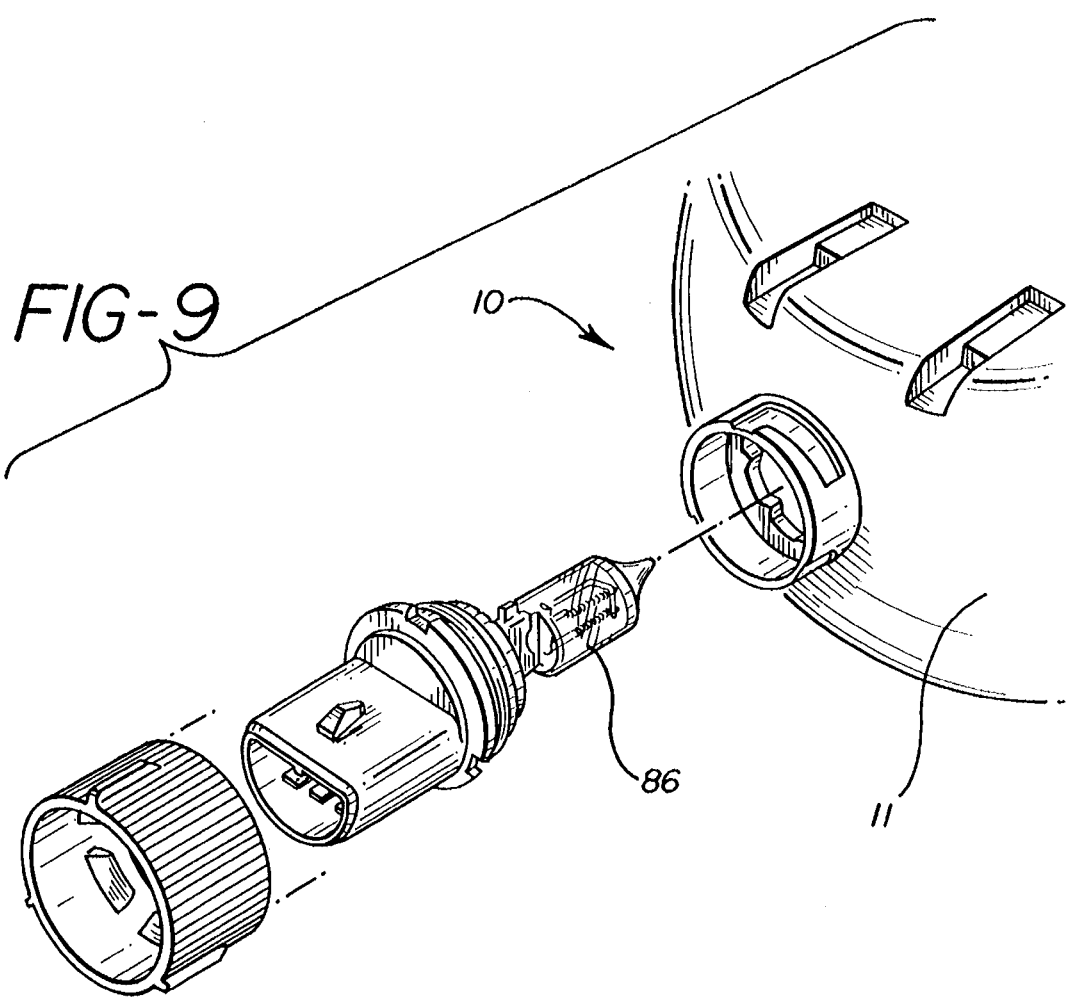

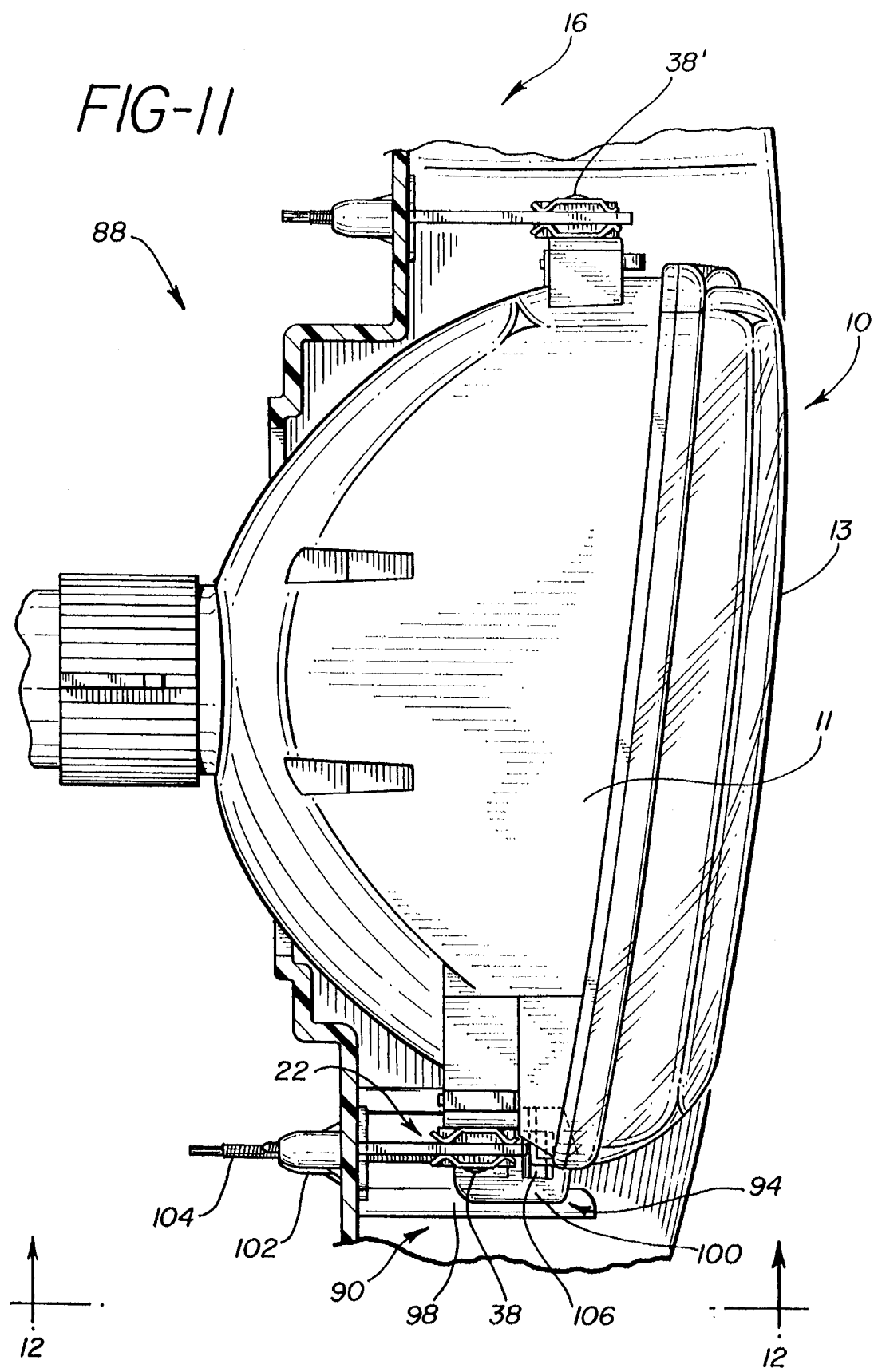

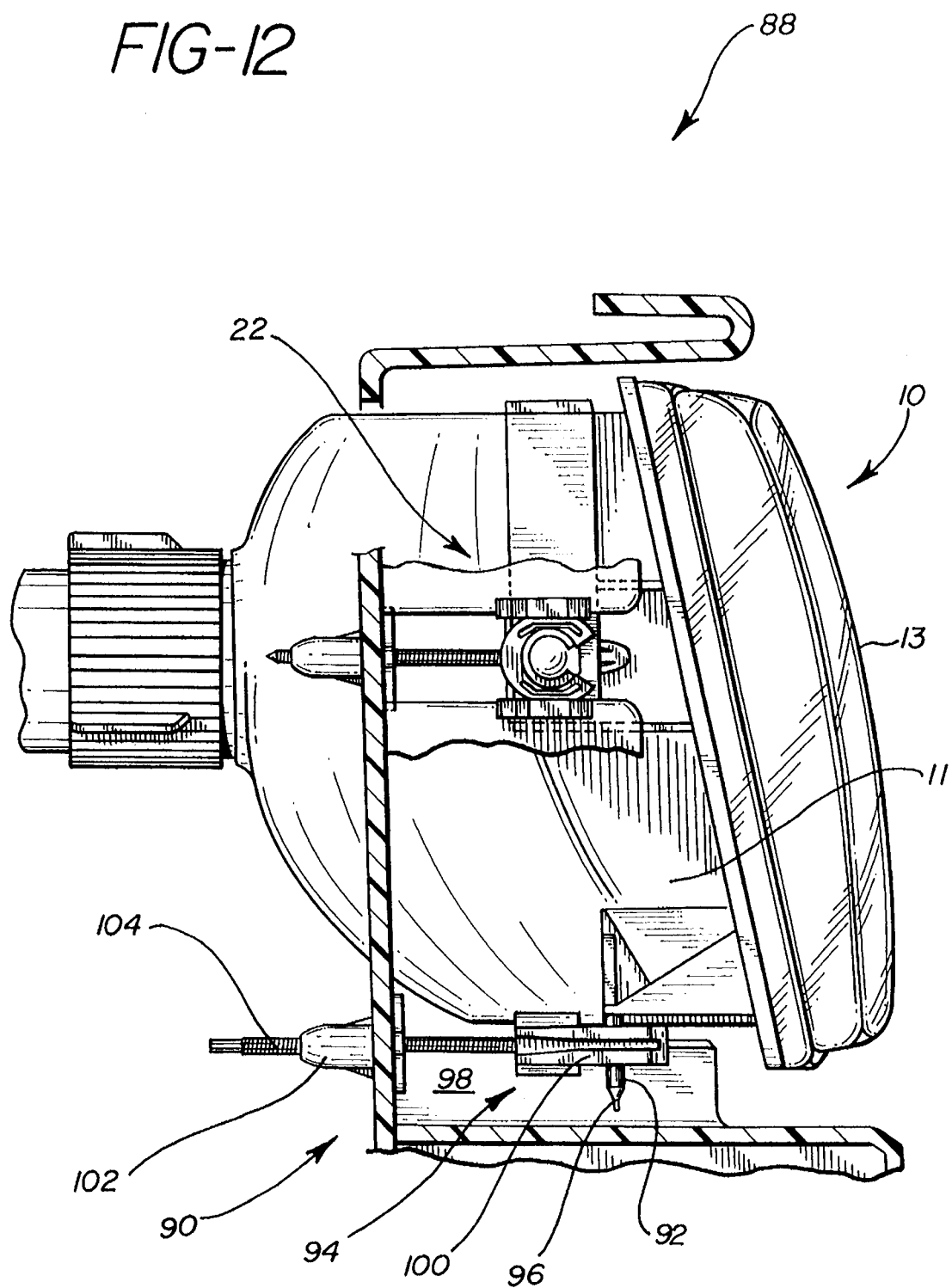

ADJUSTING AND SUPPORT APPARATUS FOR A LAMP UNIT

BACKGROUND OF THE INVENTION

The present invention relates to an adjusting and support apparatus for an automotive lamp unit such as a headlight, foglight, etc., and more particularly to one having a separate adjusting and support structure.

Conventional adjusting and support apparatus for automotive lamp units include three supports: one horizontal adjusting screw, one vertical adjusting screw, and one pivot. All three of the supports are weight-bearing in that they bear the weight of the lamp unit while supporting it within a support frame attached to the automotive vehicle. In addition to supporting the lamp unit within the support frame, the horizontal and vertical adjusting screws also serve the function of providing means for adjusting the positioning of the lamp unit, in relation to the support frame, about a vertical and horizontal axis of adjustment, respectfully, of the lamp unit. In this manner, the direction of a light beam emanating from the lamp unit can be adjusted in a horizontal plane and in a vertical plane to achieve a desired direction of aim.

Generally, the horizontal and vertical adjusting screws support the lamp unit in a cantilevered relationship where one end of the screw is attached to the support frame while the other end is attached to the lamp unit. By axially rotating the screw, the point at which the screw is attached to the lamp unit is either moved towards or away from the support frame, .depending on the direction of rotation. When the horizontal adjusting screw is thus rotated, the lamp pivots about the vertical adjusting screw and the pivot. Together, the vertical adjusting screw and pivot define the vertical axis of adjustment. In a similar fashion, when the vertical adjusting screw is axially rotated, the lamp unit pivots about its horizontal axis of adjustment, which is defined by the horizontal adjusting screw and the pivot.

An example of such a conventional adjust and support apparatus for an automotive lamp unit is disclosed in Iwamoto, U.S. Pat. No. 4,870,544. A headlight unit is supported within the body of a motor vehicle by a pivot assembly pivotally connected to one corner of the headlight unit, and a pair of holder support members fixed to opposing corners of the headlight unit such that the support members and pivot assembly define a right angle, with the pivot assembly located at the corner of the right angle. A threaded rod threadingly connects each of the holder support members with the vehicle, while the pivot assembly is simply fixed to the vehicle. In this manner, the rotation of one of the threaded rods causes the headlight unit to tilt about its vertical axis, while rotation of the other causes the headlight unit to tilt about its horizontal axis.

As mentioned, in such a conventional adjust and support apparatus, the horizontal and vertical adjusting screws provide a dual support and adjusting function via a threaded cantilever attachment of the lamp unit with the vehicle. Such an arrangement is undesirable in that, while the adjusting screws generally provide an effective mechanism by which to adjust the aim of the lamp unit, their dual role as a supporting mechanism is disadvantageous. The cantilevered adjusting screws provide a stiff support structure which tends to transmit, rather than dampen, concussions to the lamp unit caused by vehicle vibrations during travel. Such concussions, over time, may result in the failure of the filament contained within the lamp unit light bulb.

Another disadvantage inherent with conventional automotive lamp unit adjust and support mechanisms is the stringency of the positional relationship in which the pivot, horizontal adjusting screw, and vertical adjusting screw must be placed. Specifically, the pivot, horizontal adjusting screw, and vertical adjusting screw must be: 1) placed in an orthogonal relationship with one another, and 2) attached to the lamp unit in roughly the same vertical plane. These positional requirements are necessary in order to achieve proper horizontal and vertical adjustment of the aim of the lamp unit. However, such constraints limit the flexibility with which the front or grill portion of vehicles can be designed. As is known, space under the hood of the vehicle in the vicinity of the head lamps is limited. In designing a vehicle, efforts are continuously made to maximize the use of such limited space, as well as to design an aesthetically appealing grill portion with excellent fit and finish characteristics. The stringent positional relationship of the pivot, horizontal adjusting screw, and vertical adjusting screw dictated by conventional lamp unit adjust and support mechanisms frustrate such efforts.

Accordingly, it is seen that a need exists in the art for an adjusting and support apparatus for a lamp unit which provides improved support for the lamp unit and which allows greater flexibility in the positioning of the adjusting mechanism.

SUMMARY OF THE INVENTION

Those needs are met by the present invention which provides an adjusting and support apparatus for a lamp unit having a horizontal adjust and support mechanism in which the load bearing and adjusting functions are separated to provide an improved support structure which does not rely on a cantilevered arrangement. In addition, the present invention also provides a vertical adjust means which can be secured to any unoccupied position on the outside surface of the lamp unit, thereby imparting greater flexibility to the design of the front portion of the vehicle.

In accordance with one aspect of the present invention, an adjusting and support apparatus for a lamp unit is provided which comprises a horizontal adjust and support mechanism including first means for supporting the lamp unit within a support frame, the first support means secured to an outer surface of the lamp unit and to the support frame, and non-load bearing, horizontal adjust means for pivoting the lamp unit about a vertical axis thereof, the non-load bearing, horizontal adjust means being secured to the first support means and to the support frame.

The present adjusting and support apparatus further includes second support means for pivotally supporting the lamp unit within the support frame about a horizontal axis thereof and about the vertical axis. The horizontal axis passes through the horizontal adjust and support mechanism and the second support means and the vertical axis passes through the second support means.

Additionally included is vertical adjust means for causing the lamp unit to be pivoted about the horizontal axis. Advantageously, the vertical adjust means can be secured to any unoccupied position on the outer surface of the lamp unit.

Accordingly, it is a feature of the present invention to provide an adjusting and support apparatus for a lamp unit having a horizontal adjust and support mechanism in which the load bearing and adjusting functions are separated to provide an improved support structure which does not rely on a cantilevered arrangement.

It is a further feature to provide a vertical adjust means which can be secured to any unoccupied position on the outside surface of the lamp unit, thereby imparting greater flexibility to the design of the front portion of the vehicle.

These and other features and advantages of the present invention will become apparent from the following detailed description, the accompanying drawings, and the appended claims.

BRIEF DESCRIPTION OF THE DRAWINGS

FIG. 5 is a fragmentary exploded perspective view of the load-bearing slide member, lamp unit, and connecting means for connecting the load-bearing slide member with the lamp unit;

FIG. 6 is a fragmentary perspective view of the load-bearing slide member connected with the lamp unit and positioned within the slide channel, and the adjusting screw engaged with the screw receiving means and with the connecting means;

FIG. 7 is a fragmentary perspective view of the vertically oriented slide housing attached to the support frame, a slide member positioned within the slide housing, and a lamp pin extending through the horizontally oriented slot in the slide member;

FIG. 8 is an exploded perspective view of the vertically oriented slide housing and slide member;

FIG. 9 is an exploded perspective view of a light bulb contained within the lamp unit;

FIG. 11 is a top view of the lamp unit provided with the adjusting and support apparatus of FIG. 10; and FIG. 12 is a side view, partially in section, taken along line 12—12 in FIG. 11.

DESCRIPTION OF THE PREFERRED EMBODIMENTS

Figure 1:
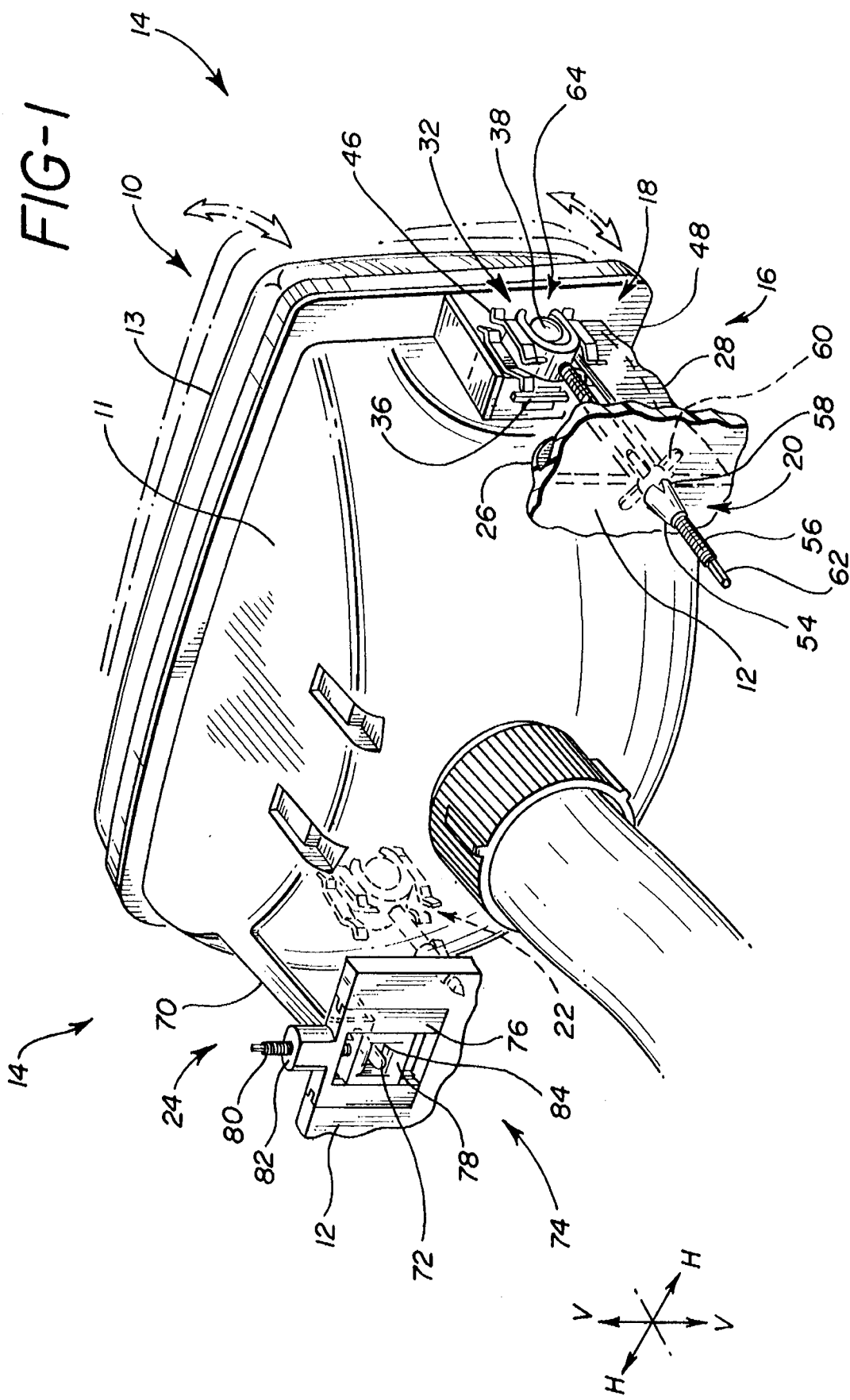
FIG. 1 is a rear perspective view of a lamp unit provided with the adjusting and support apparatus of the present invention.

Referring to FIGS. 1–4, lamp unit 10 is shown being supported in support frame 12 (only partially shown) by adjusting and support apparatus 14. Lamp unit 10 can be a headlamp, foglamp, etc., and generally includes a reflector portion 11 and a lens portion 13. Support frame 12 is a structure attached to the front or grill portion of a vehicle and is provided to house headlamps, foglamps, turning indicators, etc. Adjusting and support apparatus 14 includes horizontal adjust and support mechanism 16 (which, in turn, comprises first support means 18 for supporting lamp unit 10 within support frame 12, and non-load bearing, horizontal adjust means 20 for pivoting lamp unit 10 about its vertical axis), second support means 22 for pivotally supporting lamp unit 10 within support frame 12 about its horizontal and vertical axis, and vertical adjust means 24 for pivoting lamp unit 10 about its horizontal axis.

Figure 2:
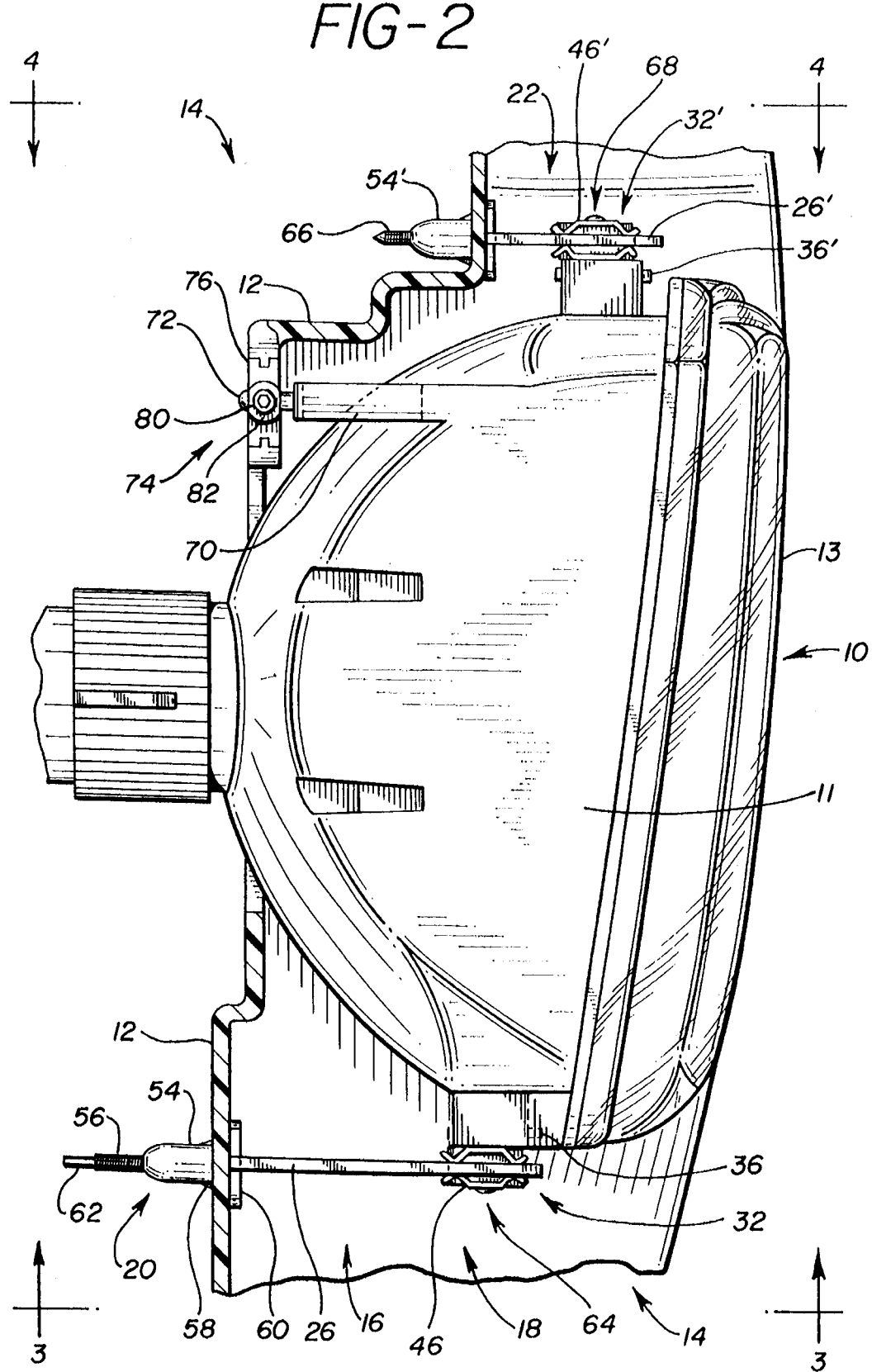
FIG. 2 is a top view of the lamp unit provided with the adjusting and support apparatus of FIG. 1.
Figure 3:
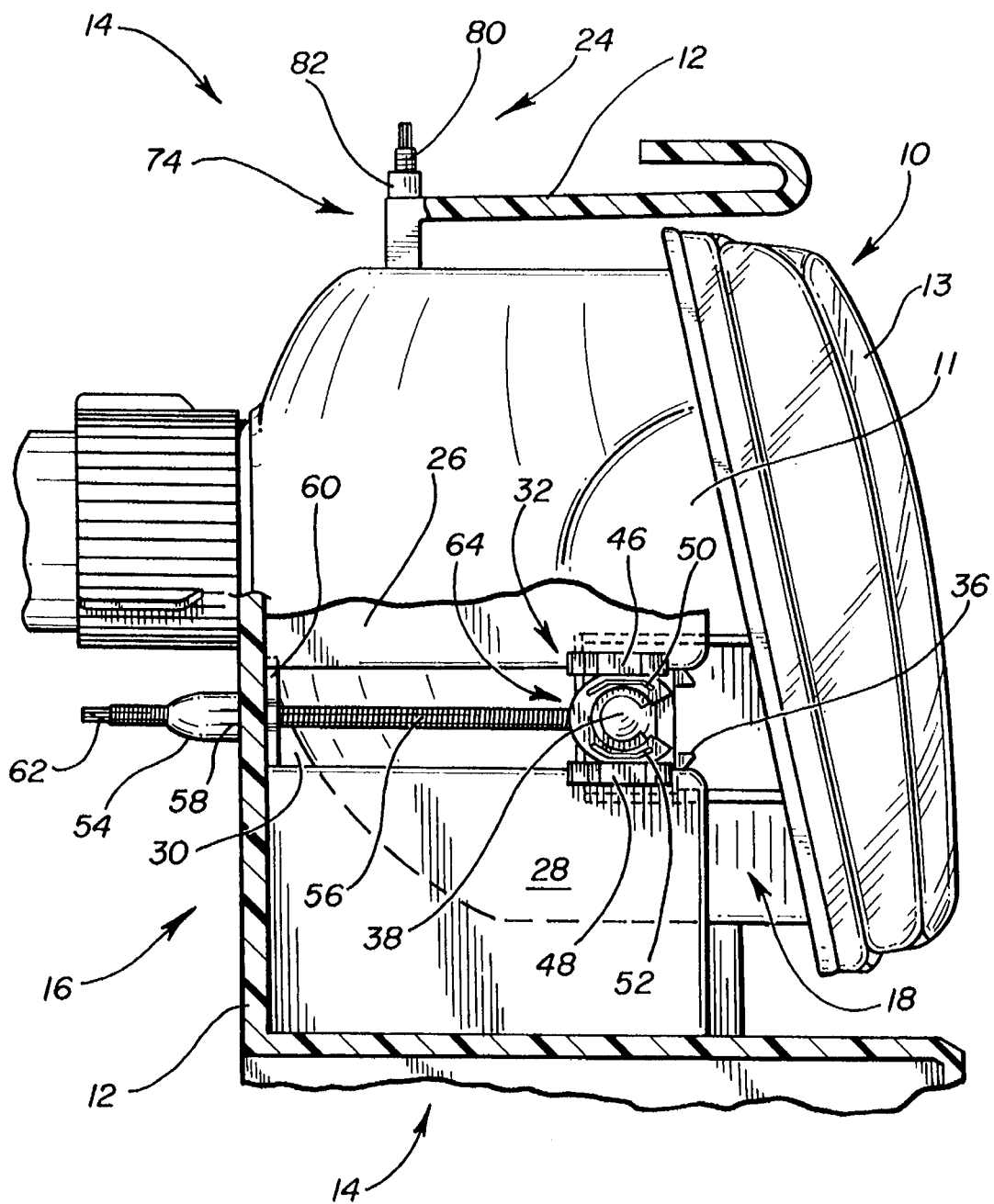
FIG. 3 is a side view, partially in section, taken along line 3—3 in FIG. 2.

Referring now to FIGS. 1–3, and particularly to FIGS. 5–6, the structure of first support means 18 will be described in detail. First support means 18, secured to the outer surface of reflector portion 11 of lamp unit 10 and to support frame 12, includes upper vertical rib 26, affixed to support frame 12, and lower vertical rib 28, also affixed to support frame 12. Upper and lower vertical ribs 26 and 28 cooperate to define horizontally oriented slide channel 30. First support means 18 further includes load-bearing slide member 32 positioned within and supported by slide channel 30, and connecting means 34 for connecting lamp unit 10 with load-bearing slide member 32. Connecting means 34 has a first portion 36 and a second portion 38. First portion 36 is fixably attached to the outer surface of reflector portion 11 of lamp unit 10, and second portion 38 is pivotally supported by load-bearing slide member 32.

Preferably, second portion 38 of connecting means 34 is ball shaped and load-bearing slide member 32 contains a cavity 40 corresponding in shape to the ball shape of second portion 38. In this manner, second portion 38 is received within correspondingly shaped cavity 40 of load-bearing slide member 32 such that second portion 38 is at least vertically pivotable (i.e. pivotable about a horizontal axis passing through second portion 38) and horizontally pivotable (i.e. pivotable about a vertical axis passing through second portion 38) within cavity 40. As will be explained in greater detail below (in conjunction with the description of non-load bearing, horizontal adjust means 20 and vertical adjust means 24), such vertical and horizontal pivotal movement of second portion 38 in cavity 40 allows lamp unit 10 to be vertically and horizontally adjusted in relation to support frame 12.

First portion 36 of connecting means 34 can be attached to reflector portion 11 of lamp unit 10 in any conventional manner. As illustrated most clearly in FIG. 5, a preferred means of attachment is to provide a receiving channel 42 on the outer surface of reflector portion 11 of lamp unit 10. First portion 36 is shaped to be unidirectionally slidable within receiving channel 42 such that insertion of first portion 36 into receiving channel 42 is permitted, while extraction therefrom is prevented without the use of a tool. Such means of attachment, commonly known as a "snap fit," advantageously allows manual attachment of first portion 36 to lamp unit 10 (i.e. without the need for tools).

As mentioned above, connecting means 34 comprises first portion 36 and second portion 38. Preferably, connecting means 34 is formed from a single piece of nylon. The union of first portion 36 with second portion 38 must possess sufficient strength to bear the portion of the weight of lamp unit 10 borne by load-bearing slide member 32, while allowing second portion 38 to be at least vertically and horizontally pivotable within cavity 40. Such union is schematically represented by union member 44, as shown in the exploded view of connecting means 34 in FIG. 5. Preferably, union member 44 is cone shaped with the base thereof widely distributed over first portion 36, while the apex terminates into second portion 38. For clarity of illustration, however, union member 44 has been shown schematically in FIG. 5 as a post.

Referring now to FIGS. 1, 3, and 6, load-bearing slide member 32 will be described in greater detail. The preferred material of construction for load-bearing slide member 32 is nylon. However, any material which possesses a comparable amount of strength and resiliency will also suffice. Preferably, load-bearing slide member 32 includes means 46 for resiliently engaging opposing sides of upper vertical rib 26, and means 48 for resiliently engaging opposing sides of lower vertical rib 28. Each of resilient engaging means 46 and 48 preferably comprise a pair of resilient "ears" which exert a compressive but resilient force on opposing sides of upper vertical rib 26 and lower vertical rib 28, respectively. In this manner, resilient engaging means 46 and 48 provide stability to lamp unit 10 by maintaining its lateral position within support frame 12 while dampening laterally transmitted shock to lamp unit 10. In addition, resilient engaging means 46 and 48 accommodate a wide range of thickness variations in upper and lower vertical ribs 26 and 28, respectively, thereby facilitating the assembly of lamp unit 10 into support frame 12.

Preferably, load-bearing slide member 32 further includes means 50 for absorbing shock travelling downwards through upper vertical rib 26, and means 52 for absorbing shock travelling upwards through lower vertical rib 28. Shock absorbing means 50 and 52 preferably take the form of compressible, elongated voids positioned above and below, respectively, cavity 40 of load-bearing slide member 32. The voids dampen shock which travels vertically through the upper or lower vertical ribs 26 and 28, thereby protecting lamp unit 10, and particularly the filaments of the light bulb positioned within lamp unit 10 (FIG. 9), from damage due to shock. In addition, horizontally oriented slide channel 30, load-bearing slide member 32, and shock absorbing means 50 and 52 are sized such that the elongated voids are compressed when load-bearing slide member 32 is installed into horizontally oriented slide channel 30. In this manner, shock absorbing means 50 and 52 provide stability to lamp unit 10 by exerting a compressive but resilient vertically oriented force against both upper vertical rib 26 and lower vertical rib 28.

Referring now to FIGS. 1–2 and 4–5, second support means 22 will be described. Second support means 22 is identical to first support means 18 in structure and in function, insofar as the structure and function of first support means 18 has been set forth. In addition, second support means 22 contains the same components as are found in first support means 18. These components are identical in structure and in function, and have been designated by the same reference numerals, except that the reference numerals designating the components of second support means 22 are followed by a prime. The names given to each component are also identical, except that, whereas reference numeral 32 designates a "load-bearing slide member," reference numeral 32' designates a "load-bearing member." The reason for the difference in names is that load-bearing slide member 32 slides along horizontally oriented slide channel 30 when non-load bearing, horizontal adjust means 20 causes lamp unit 10 to pivot about its vertical axis of adjustment in order to effect a horizontal adjustment of lamp unit 10 (this will be described in greater detail below). On the other hand, load-bearing member 32' does not slide along horizontally oriented slide channel 30' during either vertical or horizontal adjustment of lamp unit 10, but instead remains stationary therein to act as a pivot during the vertical and/or horizontal adjustments (this too will be described in greater below).

First support means 18 and second support means 22 support substantially all of the weight of lamp unit 10 within support frame 12. As stated above, it is believed advantageous to provide separate support means and adjusting means. Thus, while first support means 18 and second support means 22 support lamp unit 10 within support frame 12, non-load bearing, horizontal adjust means 20 and vertical adjust means 24 provide means for adjusting lamp unit 10 in relation to support frame 12.

Referring to FIGS. 1–4 and 6, non-load bearing, horizontal adjust means 20 will be described. The function of non-load bearing, horizontal adjust means 20 is to pivot lamp unit 10 about its vertical axis of adjustment in order to effect a horizontal adjustment of lamp unit 10 in relation to support frame 12, thereby causing the aim of a beam of light emanating from lamp unit 10 to shift in a horizontal plane. The vertical axis passes through second support means 22 and, in particular, through second portion 38' thereof. Thus, second support means 22 provides the pivot about which lamp unit 10 is horizontally adjusted.

Non-load bearing, horizontal adjust means 20 is secured to first support means 18 and to support frame 12. More specifically, non-load bearing, horizontal adjust means 20 includes screw receiving means 54 and adjusting screw 56. Screw receiving means 54 is attached to support frame 12 adjacent horizontally oriented slide channel 30. Adjusting screw 56 is engaged with screw receiving means 54 and with second portion 38 of connecting means 34 such that when adjusting screw 56 is axially rotated, connecting means 34 is translated in load-bearing slide member 32 along horizontally oriented slide channel 30, thereby causing lamp unit 10 to be pivoted about its vertical axis to effect a horizontal adjustment of lamp unit 10.

Preferably, screw receiving means 54 is adapted to be snap-fitted into a corresponding hole (not shown) positioned in support frame 12 adjacent horizontally oriented slide channel 30. Specifically, screw receiving means 54 can include resilient wings 58 which allow screw receiving means 54 to be unidirectionally inserted into the corresponding hole in support frame 12, but which, when screw receiving means 54 has been fully inserted into the hole, extend to prevent screw receiving means 54 from being extracted from the hole. In this manner, screw receiving means 54 can be installed into the proper position, as shown, without the use of tools. Screw receiving means 54 also preferably includes star member 60 which, by making contact with upper vertical rib 26 and lower vertical rib 28, prevents screw receiving means 54 from being rotated when adjusting screw 56 is axially rotated. In this manner, adjusting screw 56 can be rotated within screw receiving means 54 to effect the horizontal adjustment of lamp unit 10. The preferred material of construction of screw receiving means 54 is nylon.

Since adjusting screw 56 merely adjusts the horizontal position of lamp unit 10 without bearing any of the weight thereof, the material from which adjusting screw 56 is constructed does not have to meet high strength requirements. Materials such as plastic, nylon, or lightweight metal are acceptable materials from which adjusting screw 56 may be constructed. Tool receiving means 62 is provided on adjusting screw 56 to receive an appropriately shaped adjusting tool to effect the axial rotation of adjusting screw 56, thereby causing the horizontal adjustment of lamp unit 10. At the end 64 (not shown) of adjusting screw 56, opposite that of tool receiving means 62, adjusting screw 56 terminates in and engages second portion 38 of connecting means 34. Preferably, such engagement allows end 64 to rotate within second portion 38. More preferably, end 64 and second portion 38 form a ball and socket connection whereby end 64 is ball shaped and is received within a correspondingly shaped cavity (not shown) in second portion 38. As will be explained in more detail below, such a ball and socket connection allows second portion 38 to pivot at least vertically and horizontally with respect to adjusting screw 56. In this manner, the position of lamp unit 10 can be vertically and horizontally adjusted.

Figure 4:
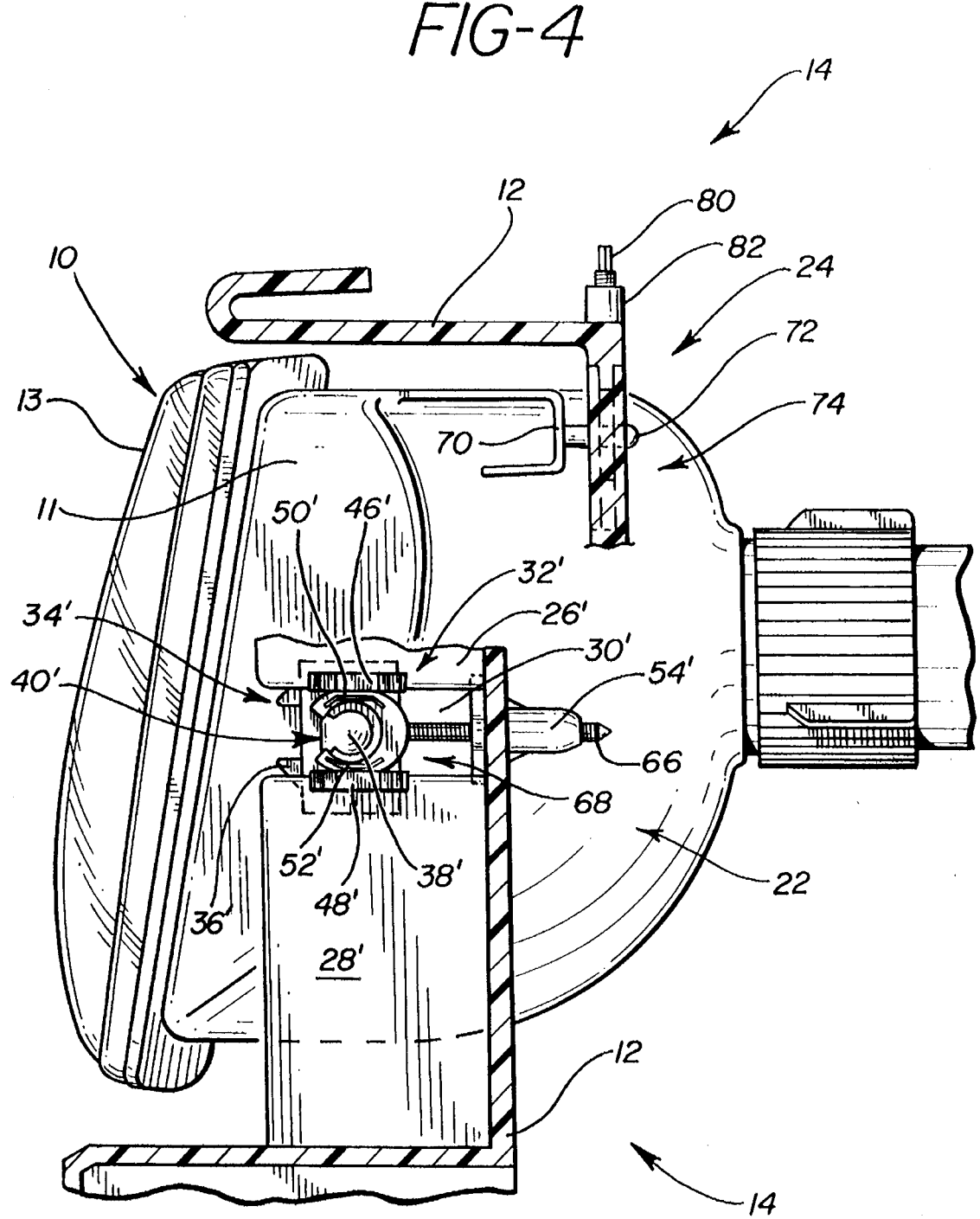
FIG. 4 is a side view, partially in section, taken along line 4—4 in FIG. 2.

As mentioned, second support means 22 provides the pivot about which lamp unit 10 is horizontally adjusted. As will be discussed below, second support means 22 also provides one of the pivot points about which lamp unit 10 is vertically adjusted. To facilitate these functions, means are provided for holding load-bearing member 32' in a stationary position within horizontally oriented slide channel 30' in order to provide a stationary pivot point. Such means are illustrated in FIGS. 2 and 4 where screw receiving means 54' is shown attached to support frame 12 adjacent horizontally oriented slide channel 30'. Holding screw 66 is engaged with screw receiving means 54' and with second portion 38' of connecting means 34'. In this manner, screw receiving means 54' and holding screw 66 hold load-bearing member 32' in a stationary position within horizontally oriented slide channel 30'.

Inasmuch as holding screw 66 merely holds the position of load-bearing member 32' within horizontally oriented slide channel 30' without bearing any of the weight of lamp unit 10, the material from which holding screw 66 is constructed does not have to meet high strength requirements. Materials such as plastic, nylon, or lightweight metal are acceptable materials from which holding screw 66 may be constructed. Preferably, end 68 (not shown) of holding screw 66 and second portion 38' form a ball and socket connection whereby end 68 is ball shaped and is received within a correspondingly shaped cavity (not shown) in second portion 38'. As will be discussed below, such a ball and socket connection allows second portion 38' to pivot at least vertically and horizontally with respect to holding screw 66. In this manner, the position of lamp unit 10 can be vertically and horizontally adjusted.

With reference now to FIGS. 1–6, the operational aspects which occur during the horizontal adjustment of lamp unit 10 will be discussed. Following the installation of lamp unit 10 into support frame 12, it may be necessary to adjust the horizontal aim of a light beam emanating from lamp unit 10. As mentioned, this is accomplished by causing lamp unit 10 to pivot about its vertical axis which passes vertically through second portion 38' of connecting means 34' of second support means 22.

Lamp unit 10 is pivoted about its vertical axis by axially rotating adjusting screw 56 via tool receiving means 62. Depending on the direction of rotation of adjusting screw 56, connecting means 34, along with load-bearing slide member 32 in which connecting means 34 (i.e. second portion 38 thereof) is pivotally supported, will translate in horizontally oriented slide channel 30 either towards or away from tool receiving means 62. Because connecting means 34 (i.e. first portion 36 thereof) is attached to lamp unit 10, the translation of load-bearing slide member 32 in horizontally oriented slide channel 30 causes lamp unit 10 to pivot about its vertical axis passing through second portion 38' of second support means 22. Such simultaneous translational and pivotal movement is provided by the ability of second portions 38 and 38' to pivot horizontally within cavity 40 of load-bearing slide member 32 and cavity 40' of load-bearing member 32', respectively. The simultaneous translational and pivotal movement is also provided by the ability of second portions 38 and 38' to pivot horizontally about end 64 of adjusting screw 56 and end 68 of holding screw 66, respectively.

As will be explained below, but which should be briefly noted at this juncture, vertical adjust means 24 does not participate in, nor interfere with, the above-described horizontal adjustment of lamp unit 10.

Referring still to FIGS. 1–6 but more particularly to FIGS. 7–8, vertical adjust means 24 will be described. Vertical adjust means 24 causes lamp unit 10 to be pivoted about its horizontal axis of adjustment to effect a vertical adjustment of the aim of a light beam emanating from lamp unit 10. The horizontal axis of lamp unit 10 passes through second support means 22 and through horizontal adjust and support mechanism 16. More particularly, the horizontal axis passes through and is defined by second portion 38' of connecting means 34' and second portion 38 of connecting means 34. Thus, when vertical adjust means 24 causes lamp unit 10 to be vertically adjusted, lamp unit 10 pivots about second portions 38' and 38 (i.e. the horizontal axis thereof).

Advantageously, vertical adjust means 24 is adapted to be secured to any unoccupied position on the outer surface of lamp unit 10. That is to say, vertical adjust means 24 may be secured to any location on the outside surface of lamp unit 10, but preferably to the outer surface of reflector portion 11, at which no other object, such as horizontal adjust and support mechanism 16 or second support means 22, is located. This feature is facilitated by further adapting vertical adjust means 24 to allow lamp unit 10 to be pivoted about its vertical axis of adjustment (via non-load bearing horizontal adjust means 20) without interference.

Preferably, vertical adjust means 24 includes lamp pin 70 attached to the outer surface of lamp unit 10. Lamp pin 70 extends substantially rearwardly and horizontally from the outer surface of lamp unit 10 to terminating endpoint 72. Lamp pin 70 preferably is formed integrally with lamp unit 10. Alternatively, lamp pin 70 can be formed separately and added to lamp unit 10. Lamp pin 70 can be shaped as a rod, blade, or any similar structure.

Vertical adjust means 24 further includes contacting means 74 for contacting lamp pin 70 in order to pivot lamp unit 10 about its horizontal axis. Preferably, contacting means 74 includes vertically oriented slide housing 76 attached to support frame 12, slide member 78 adapted to vertically translate within slide housing 76, and means for vertically translating slide member 78 within slide housing 76. A preferred means for vertically translating slide member 78 within slide housing 76 is vertical adjusting screw 80. Vertical adjusting screw 80 threadingly engages slide housing 76, at screw receiving portion 82, and rotatably engages slide member 78 in such a manner that when vertical adjusting screw 80 is axially rotated, slide member 78 vertically translates within slide housing 76.

Slide member 78 contacts lamp pin 70 such that lamp unit 10 is pivoted about its horizontal axis when slide member 78 is vertically translated within slide housing 76. The means by which slide member 78 contacts lamp pin 70 is horizontally oriented slot 84, positioned within slide member 78. Terminating endpoint 72 of lamp pin 70 extends through slot 84. As slide member 78 vertically translates and lamp unit 10 vertically pivots, lamp pin 70 moves in slot 84 in a direction which is transverse to the direction of vertical translation of slide member 78. Moreover, in order to allow lamp unit 10 to be pivoted about its vertical axis of adjustment (via non-load bearing, horizontal adjust means 20) without interference, slot 84 has sufficient length to allow lamp pin 70 to sweep in a horizontal plane within slot 84 without interference when lamp unit 10 is pivoted about its vertical axis. This feature allows vertical adjust means 24 to be placed in a non-orthogonal, non-coplanar position in relation to horizontal adjust and support mechanism 16 and second support means 22. Without the feature, vertical adjust means 24 would interfere with the horizontal pivot of lamp unit 10 such that lamp unit 10 could not be pivoted in a horizontal plane.

The aforementioned features allow vertical adjust means 24 to be secured to any unoccupied position on lamp unit 10. This facilitates the maximized use of the limited space beneath the front hood portion of an automobile, as well as the design of an aesthetically appealing grill portion with excellent fit and finish characteristics.

The preferred orientation of horizontal adjust and support mechanism 16, second support means 22, and vertical adjust means 24 is as shown in FIG. 1. That is, horizontal adjust and support mechanism 16 and second support means 22 are preferably placed near the lower portion of lamp unit 10 in roughly the same horizontal plane, with vertical adjust means 24 being placed in any unoccupied position.

Advantageously, lamp unit 10, along with adjusting and support apparatus 14, can be installed quickly and easily into support frame 12 without the use of tools. Load-bearing slide member 32 and load-bearing member 32' are slid along horizontally oriented slide channels 30 and 30', respectively, until screw receiving means 54 and 54', respectively, snap into position in support frame 12. Simultaneously, terminating endpoint 72 of lamp pin 70 slides into slot 84. The installation of lamp unit 10 into support frame 12 is then complete.

Referring now to FIG. 9, a preferred light source to be used with lamp unit 10 is illustrated. Specifically, light bulb 86 is adapted to be threadedly removable from reflector portion 11 of lamp unit 10. When the filament in light bulb 86 burns out, light bulb 86 is removed from reflector portion 11 and replaced. In this manner, lamp unit 10 and adjusting and support apparatus 14 remains in place in support frame 12 when light bulb 86 is in need of replacement.

Figure 10:
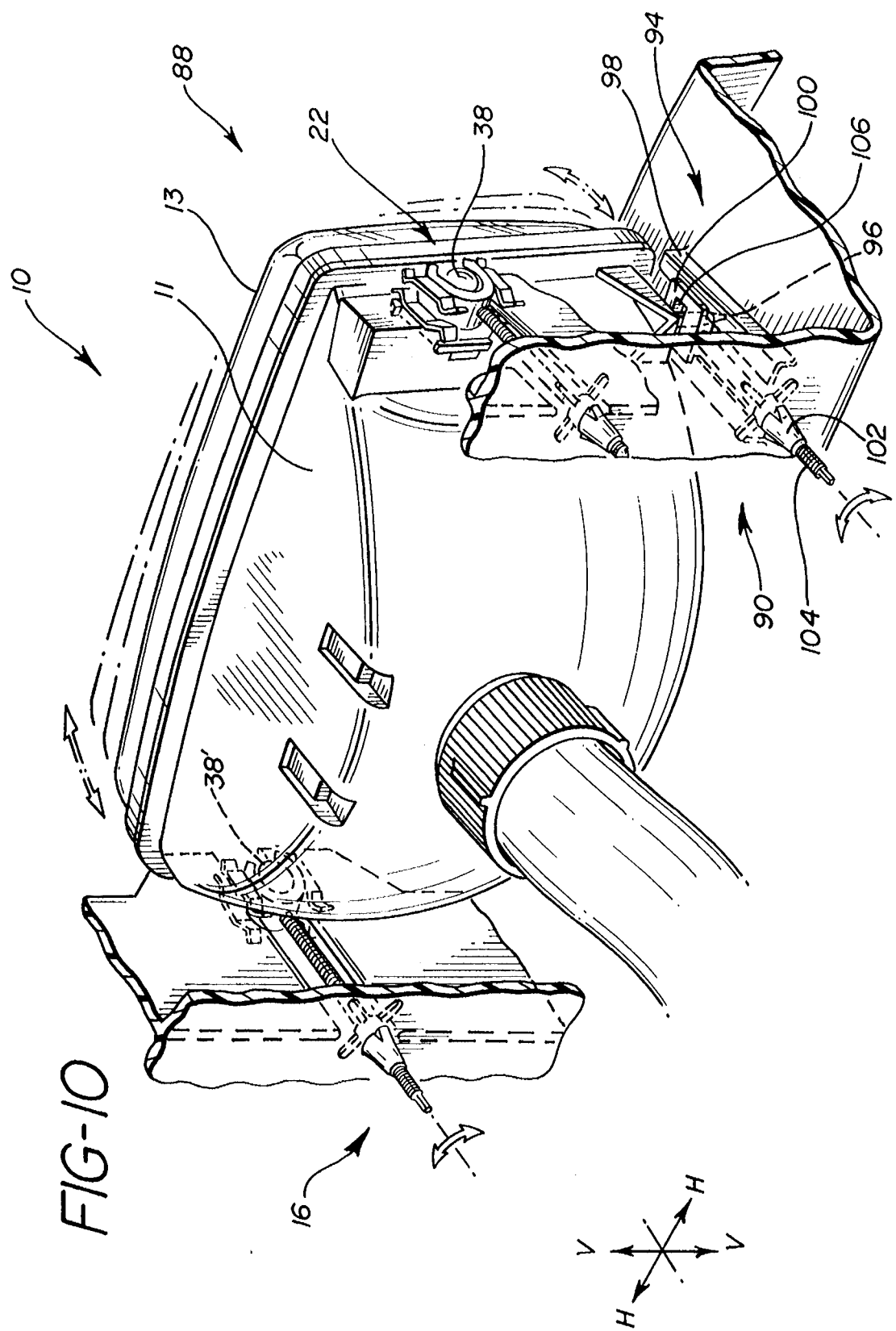
FIG. 10 is a rear perspective view of a lamp unit provided with an alternative embodiment of the adjusting and support apparatus of the present invention wherein the vertical adjust means is horizontally oriented.

Referring now to FIGS. 10–12, a second embodiment of the present adjusting and support apparatus for a lamp unit is shown. Adjusting and support apparatus 88 includes horizontal adjust and support mechanism 16, second support means 22, and vertical adjust means 90 for pivoting lamp unit 10 about its horizontal axis. Adjust and support mechanism 16 and second support means 22 are the same as those described above with respect to adjusting and support apparatus 14 and shown in FIGS. 1–6.

Vertical adjust means 90 causes lamp unit 10 to be pivoted about its horizontal axis of adjustment to effect a vertical adjustment of the aim of a light beam emanating from lamp unit 10. The horizontal axis of lamp unit 10 passes through second support means 22 and through horizontal adjust and support mechanism 16. More particularly, the horizontal axis passes through and is defined by second portion 38' of connecting means 34' and second portion 38 of connecting means 34.

Vertical adjust means 90 is adapted to be positioned in a non-coplanar (vertical) relationship with horizontal adjust and support mechanism 16 and with second support means 22. By "non-coplanar (vertical) relationship," we mean that the points of attachment of vertical adjust means 90, horizontal adjust and support mechanism 16, and second support means 22 do not have to lie in the same vertical plane with one another. However, vertical adjust means 90, horizontal adjust and support mechanism 16, and second support means 22 must be positioned in a roughly orthogonal relationship with one another. Thus, while not possessing as much positional flexibility as vertical adjust means 24, vertical adjust means 90 nevertheless possess some degree of positional flexibility by virtue of allowing non-coplanar (vertical) positioning of vertical adjust means 90, horizontal adjust and support mechanism 16, and second support means 22.

Preferably, vertical adjust means 90 includes lamp pin 92 attached to the outer surface of lamp unit 10, and contacting means 94 for contacting lamp pin 92 in order to pivot lamp unit 10 about its horizontal axis. Lamp pin 92 extends substantially downwardly and vertically from the outer surface of lamp unit 10 to terminating endpoint 96.

Contacting means 94 preferably includes horizontally oriented slide housing 98 attached to support frame 12, slide member 100 adapted to horizontally translate within slide housing 98, and means for horizontally translating slide member 100 within slide housing 98. Such means include screw receiving means 102 and adjusting screw 104. Adjusting screw 104 is threadingly engaged with screw receiving means 102 and rotatably engaged with slide member 100 in such a manner that when adjusting screw 104 is axially rotated, slide member 100 horizontally translates within slide housing 98.

Slide member 100 contacts lamp pin 92 such that lamp unit 10 is pivoted about its horizontal axis when slide member 100 is horizontally translated within slide housing 98. Preferably, slide member 100 includes slot 106 positioned within slide member 100. Terminating endpoint 96 of lamp pin 92 extends through slot 106. Slot 106 is oriented such that lamp pin 92 moves without interference when lamp unit 10 is pivoted about its vertical axis. Specifically, when lamp unit 10 is pivoted about its vertical axis, lamp pin 92 will translate within slot 106 in order to compensate for the non-coplanar (vertical) placement of vertical adjust means 90, horizontal adjust and support mechanism 16, and second support means 22. In this manner, vertical adjust means 90 does not bind or interfere with the horizontal adjustment of lamp unit 10.

A third embodiment of the present adjusting and support apparatus is also provided whereby horizontal adjust and support mechanism 16 and second support means 22, as described above in regards to adjusting and support apparatus 14 (and adjusting and support apparatus 88), are positioned in relation to lamp unit 10 as shown in FIGS. 1 and 10, respectively. Vertical adjust means for pivoting lamp unit 10 about its horizontal axis, identical in structure and function to horizontal adjust and support mechanism 16, is attached to lamp unit 10 in approximately the same position as vertical adjust means 24, as shown in FIG. 1, or in the same position as vertical adjust means 90, as shown in FIG. 10. Whereas horizontal adjust and support mechanism 16 causes lamp unit 10 to pivot about its vertical axis of adjustment to effect a horizontal adjustment thereof, the vertical adjust means of this third embodiment, functioning in exactly the same manner as horizontal adjust and support mechanism 16, causes lamp unit 10 to pivot about its horizontal axis of adjustment to effect a vertical adjustment thereof. The vertical axis of lamp unit 10 passes vertically through the vertical adjust means and through second support means 22. The horizontal axis of lamp unit 10 passes horizontally through horizontal adjust and support mechanism 16 and through second support means 22. Thus, in this third embodiment, horizontal adjust and support mechanism 16, second support means 22, and the vertical adjust means must be positioned in an orthogonal relationship with one another and must be vertically coplanar with one another.

The vertical adjust means of this third embodiment is identical in structure and operation to horizontal adjust and support mechanism 16 as described above and as shown in detail in FIG. 6. Thus, with reference to FIG. 6, the vertical adjust means of this third embodiment includes third support means (identical to first support means 18) for supporting lamp unit 10 within support frame 12, and non-load bearing, vertical adjust means (identical to non-load bearing, horizontal adjust means 20) for causing lamp unit 10 to be pivoted about its horizontal axis. The support means is secured to the outer surface of lamp unit 10 and to support frame 12 while the non-load bearing, vertical adjust means is secured to the third support means and to support frame 12.

The third support means includes an upper vertical rib (identical to upper vertical rib 26) affixed to support frame 12 and a lower vertical rib (identical to lower vertical rib 28) affixed to support frame 12, the upper and lower vertical ribs cooperating to define a horizontally oriented slide channel (identical to horizontally oriented slide channel 30). The third support means also includes a load-bearing slide member (identical to load-bearing slide member 32) positioned within the slide channel, and connecting means (identical to connecting means 34) for connecting lamp unit 10 with the load-bearing slide member. The connecting means has a first portion and a second portion (identical to first and second portions 36 and 38), the first portion being fixably attached to the outer surface of lamp unit 10 and the second portion being pivotally supported by the load-bearing slide member.

Preferably, the second portion of the connecting means is ball shaped, the load-bearing slide member contains a cavity (identical to cavity 40) corresponding in shape to the second portion, and the second portion is received within the correspondingly shaped cavity of the load-bearing slide member such that the second portion is at least vertically and horizontally pivotable within the cavity to allow lamp unit 10 to be horizontally and vertically adjusted in relation to support frame 12.

Preferably, the load-bearing slide member includes means for resiliently engaging opposing sides of the upper vertical rib and means for resiliently engaging opposing sides of the lower vertical rib (identical to resilient engaging means 46 and 48), both of the resilient engaging means providing stability to the lamp unit. The load-bearing slide member preferably further includes means for absorbing shock travelling through the upper vertical rib and means for absorbing shock travelling through the lower vertical rib (identical to shock absorbing means 50 and 52), both of the shock absorbing means protecting the lamp unit from damage due to shock.

The non-load bearing, vertical adjust means may include a screw receiving means (identical to screw receiving means 54) mounted on the support frame adjacent the horizontally oriented slide channel, and an adjusting screw (identical to adjusting screw 56) engaged with the screw receiving means and with the second portion of the connecting means such that when the adjusting screw is axially rotated, the connecting means is translated in the load-bearing slide member along the horizontally oriented slide channel, thereby causing the lamp unit to be pivoted around the horizontal axis to effect a vertical adjustment of the lamp unit. The adjusting screw and the second portion of the connecting means preferably form a ball and socket connection.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame, said first support means comprising, an upper vertical rib affixed to said support frame and a lower vertical rib affixed to said support frame, said upper and lower vertical ribs cooperating to define a horizontally oriented slide channel, a load-bearing slide member positioned within said slide channel, said load-bearing slide member including,
means for resiliently engaging opposing sides of said upper vertical rib, and
means for resiliently engaging opposing sides of said lower vertical rib, both of said resilient engaging means providing stability to said lamp unit, and means for connecting said lamp unit with said load-bearing slide member, said connecting means having a first portion and a second portion, said first portion being fixably attached to said outer surface of said lamp unit and said second portion being pivotally supported by said load-bearing slide member;

second support means for pivotally supporting said lamp unit within said support frame about a horizontal axis thereof and about said vertical axis, said horizontal axis passing through said horizontal adjust and support mechanism and said second support means, and said vertical axis passing through said second support means; and vertical adjust means for pivoting said lamp unit about said horizontal axis.

2. The apparatus of claim 1 wherein said load-bearing slide member further includes:

means for absorbing shock travelling through said upper vertical rib; and means for absorbing shock travelling through said lower vertical rib, both of said shock absorbing means protecting said lamp unit from damage due to shock.

3. The apparatus of claim 1 wherein said vertical adjust means comprises:

third support means for supporting said lamp unit within said support frame, said third support means secured to said outer surface of said lamp unit and to said support frame; and non-load bearing, vertical adjust means for causing said lamp unit to be pivoted about said horizontal axis, said non-load bearing, vertical adjust means secured to said third support means and to said support frame.

4. The apparatus of claim 3 wherein said third support means comprises:

an upper vertical rib affixed to said support frame and a lower vertical rib affixed to said support frame, said upper and lower vertical ribs cooperating to define a horizontally oriented slide channel;

a load-bearing slide member positioned within said slide channel; and means for connecting said lamp unit with said load-bearing slide member, said connecting means having a first portion and a second portion, said first portion being fixably attached to said outer surface of said lamp unit and said second portion being pivotally supported by said load-bearing slide member.

5. The apparatus of claim 4 wherein said load-bearing slide member includes:

means for resiliently engaging opposing sides of said upper vertical rib; and means for resiliently engaging opposing sides of said lower vertical rib, both of said resilient engaging means providing stability to said lamp unit.

6. The apparatus of claim 2 wherein said means for absorbing shock travelling through said upper vertical rib comprises means for defining an upper compressible void for dampening shock which travels through said upper vertical rib.

7. The apparatus of claim 2 wherein said means for absorbing shock travelling through said lower vertical rib comprises means for defining a lower compressible void for dampening shock which travels through said lower vertical rib.

8. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame;

second support means for pivotally supporting said lamp unit within said support frame about a horizontal axis thereof and about said vertical axis, said horizontal axis passing through said horizontal adjust and support mechanism and said second support means, and said vertical axis passing through said second support means, said second support means including an upper vertical rib affixed to said support frame and a lower vertical rib affixed to said support frame, said upper and lower vertical ribs cooperating to define a horizontally oriented slide channel, a load-bearing member positioned within said slide channel, said load-bearing member including means for resiliently engaging opposing sides of said upper vertical rib, and means for resiliently engaging opposing sides of said lower vertical rib, both of said resilient engaging means providing stability to said lamp unit, means for connecting said lamp unit to said load-bearing member, said connecting means having a first portion and a second portion, said first portion being fixably attached to said outer surface of said lamp unit and said second portion being pivotally supported by said load-bearing member, and means for holding said load-bearing member in a stationary position within said horizontally oriented slide channel in order to provide a stationary pivot point; and vertical adjust means for pivoting said lamp unit about said horizontal axis.

9. The apparatus of claim 8 wherein said load-bearing member further includes:

means for absorbing shock travelling through said upper vertical rib; and means for absorbing shock travelling through said lower vertical rib, both of said shock absorbing means protecting said lamp unit from damage due to shock.

10. The apparatus of claim 9 wherein said means for absorbing shock travelling through said upper vertical rib comprises means for defining an upper compressible void for dampening shock which travels through said upper vertical rib.

11. The apparatus of claim 9 wherein said means for absorbing shock travelling through said lower vertical rib comprises means for defining a lower compressible void for dampening shock which travels through said lower vertical rib.

12. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame;

second support means for pivotally supporting said lamp unit within said support frame about a horizontal axis thereof and about said vertical axis, said horizontal axis passing through said horizontal adjust and support mechanism and said second support means, and said vertical axis passing through said second support means; and vertical adjust means for pivoting said lamp unit about said horizontal axis, said vertical adjust means being adapted to be secured to any unoccupied position on said outer surface of said lamp unit.

13. The apparatus of claim 12 wherein said vertical adjust means is adapted to allow said lamp unit to be pivoted about said horizontal axis without interference.

14. The apparatus of claim 13 wherein vertical adjust means for pivoting comprises:

a lamp pin attached to said outer surface of said lamp unit, said lamp pin extending substantially rearwardly and horizontally from said outer surface of said lamp unit to a terminating endpoint; and means for contacting said lamp pin to pivot said lamp unit about said horizontal axis.

15. The apparatus of claim 12 wherein said vertical adjust means comprises:

a lamp pin attached to said outer surface of said lamp unit, said lamp pin extending from said outer surface of said lamp unit to a terminating endpoint; and means for contacting said lamp pin to pivot said lamp unit about said horizontal axis.

16. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame;

second support means for pivotally supporting said lamp unit within said support frame about a horizontal axis thereof and about said vertical axis, said horizontal axis passing through said horizontal adjust and support mechanism and said second support means, and said vertical axis passing through said second support means; and vertical adjust means for pivoting said lamp unit about said horizontal axis, said vertical adjust means comprising third support means for supporting said lamp unit within said support frame, said third support means secured to said outer surface of said lamp unit and to said support frame, said third support means comprising, an upper vertical rib affixed to said support frame and a lower vertical rib affixed to said support frame, said upper and lower vertical ribs cooperating to define a horizontally oriented slide channel, a load-bearing slide member positioned within said slide channel, said load-bearing slide member including means for resiliently engaging opposing sides of said upper vertical rib, and means for resiliently engaging opposing sides of said lower vertical rib, both of said resilient engaging means providing stability to said lamp unit, and means for connecting said lamp unit with said load-bearing slide member, said connecting means having a first portion and a second portion, said first portion being fixably attached to said outer surface of said lamp unit and said second portion being pivotally supported by said load-bearing slide member; and non-load bearing, vertical adjust means for causing said lamp unit to be pivoted about said horizontal axis, said non-load bearing, vertical adjust means secured to said third support means and to said support frame.

17. The apparatus of claim 16 wherein said load-bearing slide member further includes:

means for absorbing shock travelling through said upper vertical rib; and means for absorbing shock travelling through said lower vertical rib, both of said shock absorbing means protecting said lamp unit from damage due to shock.

18. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame;

second support means for pivotally supporting said lamp unit within said support frame about a horizontal axis thereof and about said vertical axis, said horizontal axis passing through said horizontal adjust and support mechanism and said second support means, and said vertical axis passing through said second support means; and vertical adjust means for pivoting said lamp unit about said horizontal axis, said vertical adjust means being adapted to be secured to any unoccupied position on said outer surface of said lamp unit and being adapted to allow said lamp unit to be pivoted about said horizontal axis without interference, said vertical adjust means for pivoting comprising, a lamp pin attached to said outer surface of said lamp unit, said lamp pin extending substantially rearwardly and horizontally from said outer surface of said lamp unit to a terminating endpoint, and means for contacting said lamp pin to pivot said lamp unit about said horizontal axis, said contacting means comprising, a vertically oriented slide housing attached to said support frame, a slide member adapted to vertically translate within said slide housing, said slide member contacting said lamp pin such that said lamp unit is pivoted about said horizontal axis when said slide member is vertically translated within said slide housing, and means for vertically translating said slide member within said slide housing.

19. The apparatus of claim 18 wherein said slide member includes a horizontally oriented slot positioned within said slide member, said terminating endpoint of said lamp pin extending through said horizontally oriented slot, said horizontally oriented slot having sufficient length to allow said lamp pin to sweep in a horizontal plane without interference when said lamp unit is pivoted about said vertical axis.

20. An adjusting and support apparatus for a lamp unit, comprising:

a horizontal adjust and support mechanism including first means for supporting said lamp unit within a support frame, said first support means secured to an outer surface of said lamp unit and to said support frame, and non-load bearing, horizontal adjust means for pivoting said lamp unit about a vertical axis thereof, said non-load bearing, horizontal adjust means secured to said first support means and to said support frame;

second support means for pivotally supporting said lamp unit within said support frame about a horizontal axis thereof and about said vertical axis, said horizontal axis passing through said horizontal adjust and support mechanism and said second support means, and said vertical axis passing through said second support means; and vertical adjust means for pivoting said lamp unit about said horizontal axis, said vertical adjust means being adapted to be secured to any unoccupied position on said outer surface of said lamp unit, said vertical adjust means comprising, a lamp pin attached to said outer surface of said lamp unit, said lamp pin extending from said outer surface of said lamp unit to a terminating endpoint, and means for contacting said lamp pin to pivot said lamp unit about said horizontal axis, said contacting means comprising, a horizontally oriented slide housing attached to said support frame, a slide member adapted to horizontally translate within said slide housing, said slide member contacting said lamp pin such that said lamp unit is pivoted about said horizontal axis when said slide member is horizontally translated within said slide housing; and 21. The apparatus of claim 20 wherein said slide member includes a slot positioned within said slide member, said terminating endpoint of said lamp pin extending through said slot, said slot being oriented such that said lamp pin moves without interference when said lamp unit is pivoted about said vertical axis.

* * * * *